United States Patent
Gayler

(10) Patent No.: US 9,259,076 B2
(45) Date of Patent: Feb. 16, 2016

(54) CASE FOR ELECTRONIC TABLET DEVICE

(71) Applicant: William Gayler, Las Vegas, NV (US)

(72) Inventor: William Gayler, Las Vegas, NV (US)

(73) Assignee: Origin Applications, LLC, Park City, UT (US)

( * ) Notice: Subject to any disclaimer, the term of this patent is extended or adjusted under 35 U.S.C. 154(b) by 0 days.

(21) Appl. No.: 14/094,296

(22) Filed: Dec. 2, 2013

(65) Prior Publication Data

US 2014/0151417 A1 Jun. 5, 2014

Related U.S. Application Data

(63) Continuation-in-part of application No. 13/691,540, filed on Nov. 30, 2012, now abandoned.

(51) Int. Cl.
| | |
|---|---|
| *B65D 85/00* | (2006.01) |
| *A45F 5/00* | (2006.01) |
| *G06F 1/16* | (2006.01) |
| *A45C 3/00* | (2006.01) |

(52) U.S. Cl.
CPC . *A45F 5/00* (2013.01); *G06F 1/163* (2013.01); *G06F 1/1628* (2013.01); *A45C 3/001* (2013.01); *A45F 2005/008* (2013.01)

(58) Field of Classification Search
CPC .................... A45C 2011/002; A45C 2011/003
USPC ........................................................ 206/320
See application file for complete search history.

(56) References Cited

U.S. PATENT DOCUMENTS

| | | |
|---|---|---|
| 6,913,159 B1 | 7/2005 | Goldberg |
| 7,469,809 B2 | 12/2008 | Rodarte et al. |
| D641,154 S | 7/2011 | Smith |
| D651,205 S | 12/2011 | Soekoro |
| D651,606 S | 1/2012 | Luijben |
| 8,120,896 B2 | 2/2012 | Mori et al. |
| 8,132,670 B1 | 3/2012 | Chen |
| D657,795 S | 4/2012 | Smith et al. |
| 8,223,477 B2 | 7/2012 | Shi et al. |
| 8,230,992 B2 | 7/2012 | Law et al. |

(Continued)

OTHER PUBLICATIONS

Thompson, John ("Cloak iPad Case—Keep Your Apple Table Protected With Slim & Sleek Design") Zath UK Tech Blog, Dec. 10, 2010, pp. 1-3, obtained from http://zath.co.uk/cloak-ipad-case-keep-your-apple-tablet-protected-with-slim-sleek-design/.

Amazon.com ("LapWorks 2Loop iPad Handle—With Two Finger Loops and Multi-Positional Support Arm With Silicone Case and 360 Degree Swivel") by LapWorks; first available date at Amazon.comOct. 29, 2011; pp. 1-6, obtained from http://www.amazon.com/LapWorks-2Loop-iPad-Handle-Multi-Positional/dp/B0061211VQ.

(Continued)

*Primary Examiner* — Anthony Stashick
*Assistant Examiner* — James Way
(74) *Attorney, Agent, or Firm* — Greenberg Traurig, LLP

(57) ABSTRACT

An electronic tablet case includes a body configured to receive an electronic tablet and one or more sets of finger loops on a rear surface of the body. The finger loops are configured to receive a user's individual fingers thereby allowing the user to hold the case and electronic tablet with one hand while operating the electronic tablet with the other hand. In one version, there are four sets of finger loops spaced (i.e., one set along each edge) about a perimeter of the rear of the body. The case may be fabricated of four layers of materials comprising: a waterproof outer layer, rigid protective layer, durable padded layer and non-scratch inner layer. A neoprene face perimeter layer connected to a body defines a sleeve for receiving a tablet Distinguishable portions of the case identify functional tablet buttons thereunder allowing a user to operate the tablet by pressing the distinguishable portions.

16 Claims, 5 Drawing Sheets

(56) References Cited

U.S. PATENT DOCUMENTS

| | | |
|---|---|---|
| 8,253,518 B2 | 8/2012 | Lauder et al. |
| 8,268,259 B2 | 9/2012 | Zocchi |
| 8,281,924 B2 | 10/2012 | Westrup |
| D674,380 S | 1/2013 | Soekoro |
| D675,197 S | 1/2013 | Losiewicz |
| 2009/0270050 A1 | 10/2009 | Brown |
| 2010/0176140 A1 | 7/2010 | Bergman |
| 2010/0222118 A1 | 9/2010 | Interdanato |
| 2011/0036876 A1* | 2/2011 | Fathollahi ............ 224/191 |
| 2011/0065486 A1 | 3/2011 | Bayrami |
| 2011/0240830 A1 | 10/2011 | Alemozafar et al. |
| 2011/0266313 A1 | 11/2011 | Ghalib et al. |
| 2012/0031937 A1* | 2/2012 | Baker ............ 224/217 |
| 2012/0037285 A1* | 2/2012 | Diebel et al. ............ 150/165 |
| 2012/0048873 A1 | 3/2012 | Hyseni |
| 2012/0055960 A1 | 3/2012 | Chen |
| 2012/0091312 A1 | 4/2012 | Baker |
| 2012/0152955 A1 | 6/2012 | Middleton |
| 2012/0228169 A1 | 9/2012 | Huang |
| 2012/0247991 A1 | 10/2012 | Meehan |
| 2012/0255955 A1 | 10/2012 | Nolan |
| 2012/0305445 A1* | 12/2012 | Hu ............ 206/775 |
| 2012/0319414 A1 | 12/2012 | Potter et al. |
| 2013/0001107 A1 | 1/2013 | Armstrong |
| 2013/0008914 A1 | 1/2013 | Dyer |
| 2013/0092562 A1* | 4/2013 | Wyner et al. ............ 206/45.23 |
| 2013/0241381 A1* | 9/2013 | Hynecek et al. ............ 312/240 |

OTHER PUBLICATIONS

The Girl C.R.E.A.T.I.V.E. ("Handmade Table Cover and Carrying Case") Pixeltrashamania, May 16, 2011, pp. 1-6, obtained from http://pixeltrashamania.blogspot.com/2011/05/handmade-tablet-cover-and-carrying-case.html.

alibaba.com ("Black Folio Leather Case +Film+Stylus &Arm band for 7" Huawei MediaPad Tablet") Aliexpress.com, pp. 1-7, obtained from http://www.aliexpress.com/item/BLACK-Folio-Leather-Case-Film-Stylus-Arm-band-For-7-Huawei-MediaPad-Tablet/537750148.html.

iwowcase.com ("Dream Rings Series Amazing iPhone4/4S Case—Blue"), copyright 2012, pp. 1-4, obtained from http://www.iwowcase.com/dream-rings-series-amazing-iphone44s-caseblue-p-5002.html.

Day, Sonny M. ("Best iPad Case Roundup") Tripwire Magazine, Mar. 2, 2012, pp. 1-40, obtained from http://www.tripwiremagazine.com/2012/03/best-ipad-case.html.

* cited by examiner

CASE FOR ELECTRONIC TABLET DEVICE

CROSS REFERENCE

This application is a continuation-in-part of U.S. patent application Ser. No. 13/691,540 filed on Nov. 30, 2012 which is incorporated herein by reference for any and all purposes.

FIELD OF THE INVENTION

The embodiments of the present invention relate to a case for retaining and protecting an electronic tablet (e.g., iPad®).

BACKGROUND

Electronic tablets, such as the iPad®, Nexus® and Kindle®, have become ubiquitous in our modern society. Such electronic tablets are costly and thus it makes sense to protect such devices. A simple Internet search turns up numerous cases designed to protect electronic tablets. Some cases are made of rigid materials while others are made of flexible and resilient materials.

It would be advantageous to develop a case for electronic tablets that allows the user to easily, naturally and securely handle and manipulate the position of the electronic tablet during use while the electronic table is in the case.

SUMMARY

Accordingly, one embodiment of the present invention comprises an electronic tablet case including a body configured to receive an electronic tablet and one or more sets of finger loops on a rear surface of said body. The finger loops are configured to receive a user's individual fingers thereby allowing the user to hold the case and electronic tablet with one hand while operating the electronic tablet with the other hand. In one embodiment, there are four sets of finger loops spaced (i.e., one set along each edge) about a perimeter of the rear of the body and may be made of different sizes to accommodate different users.

In one embodiment, the case is fabricated of four layers of materials comprising: (1) a waterproof and stain proof outer layer; (2) rigid protective layer; (3) durable foam layer; and (4) non-scratch inner layer. A neoprene face layer maintains the tablet in place against the other layers.

The case according to the embodiments of the present invention may be fabricated of rigid, flexible, resilient, memory and any other suitable materials. Moreover, the case may be configured to receive any tablet design regardless of the dimensions of the tablet.

Other variations, embodiments and features of the present invention will become evident from the following detailed description, drawings and claims.

DETAILED DESCRIPTION

Figure 1:
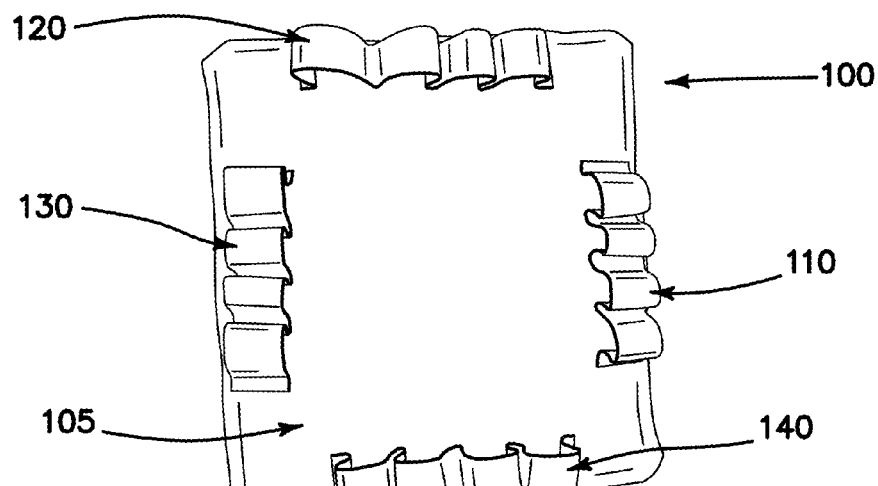
FIG. 1 illustrates a rear view of an electronic tablet case according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

The components of the embodiments of the present invention may be fabricated of any suitable materials (e.g., plastic, neoprene, elastic, leather, etc.) and may be made using suitable techniques. As required, materials and fabrication techniques are presented below.

Figure 2:
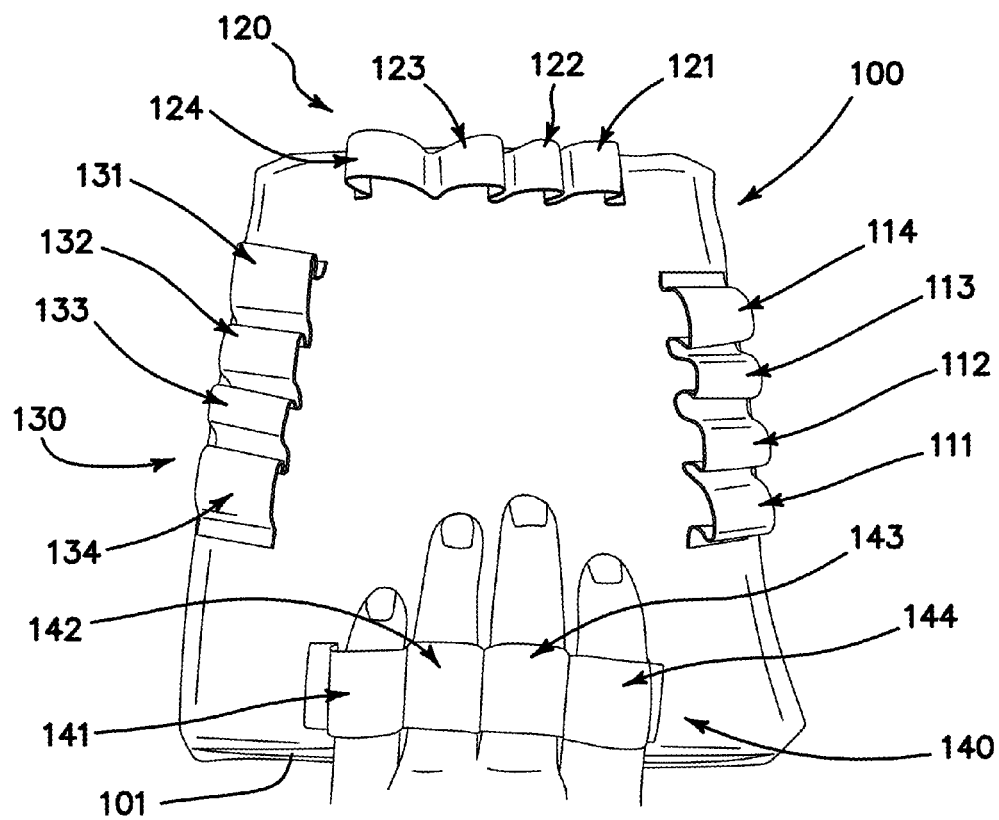
FIG. 2 illustrates a rear view of an electronic tablet case with fingers inserted according to the embodiments of the present invention.
Figure 4:
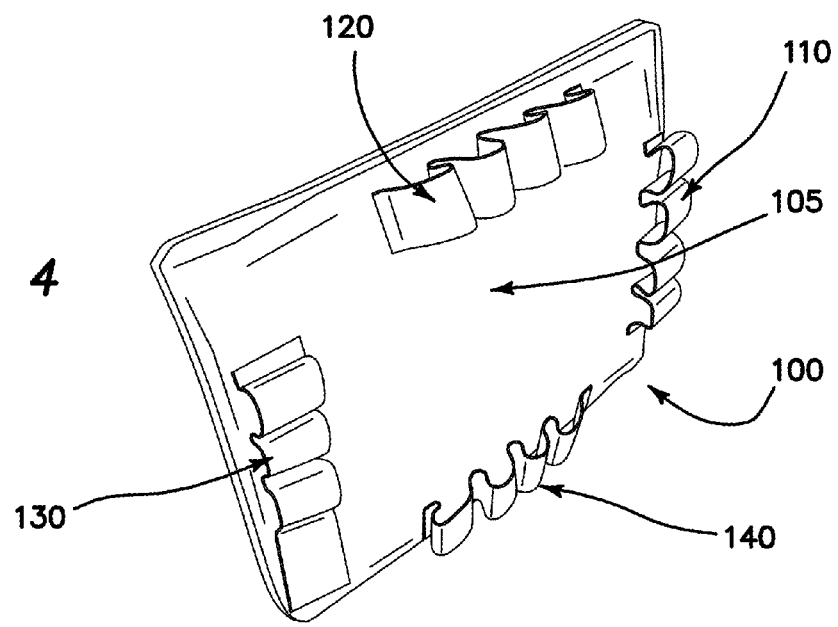
FIG. 4 illustrates another rear view of an electronic tablet case according to the embodiments of the present invention.

FIGS. 1, 2 and 4 show rear views of an electronic tablet case 100 according to the embodiments of the present invention. The electronic table case 100 includes a body 105, a first set of finger loops 110, a second set of finger loops 120, a third set of finger loops 130 and a fourth set of finger loops 140. The first set of finger loops 110 includes four finger loops 111-114; the second set of finger loops 120 includes four finger loops 121-124; the third set of finger loops 130 includes four finger loops 131-134 and the fourth set of finger loops 140 includes four finger loops 141-144. Those skilled in the art will recognize that more or less than four sets of finger loops may be incorporated and each set of finger loops may include more or less than four finger loops.

In one embodiment, as shown in FIGS. 1, 2 and 4, the four sets of finger loops 110-140 are spaced about the perimeter of the rear of the body 105 such that one set of finger loops 110-140 is positioned along each of the four edges of the body 105. Those skilled in the art will recognize that the position of the sets of finger loops may be different without departing from the spirit and scope of the embodiments of the present invention.

Figure 3:
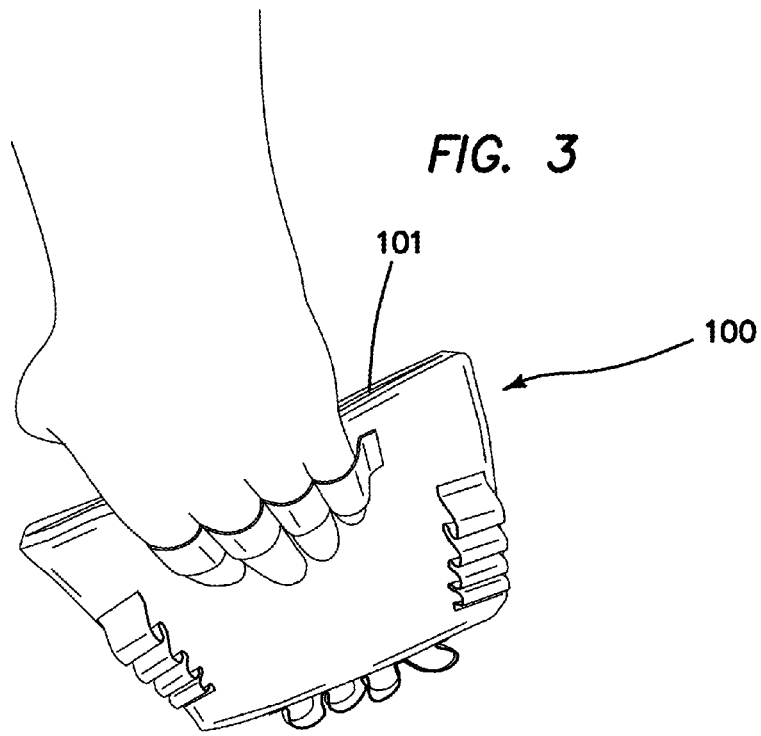
FIG. 3 illustrates a rear view of an electronic tablet case supported by fingers of a user according to the embodiments of the present invention.

FIGS. 2 and 3 show rear views of the case 100 during use. Use comprises inserting fingers from one hand into one set of the finger loops 110-140. For example, as shown in FIG. 2, a user's pinky is inserted into finger loop 141, a ring finger is inserted into finger loop 142, a middle finger is inserted into finger loop 143 and an index finger is inserted into finger loop 144. The thumb remains free to provide additional control and retention of the case 100 and electronic tablet 150. In this manner, the user is able to hold and maneuver the electronic tablet 150 with the inserted hand while interacting with the touch screen of the electronic tablet 150 with their other hand.

In one embodiment, the sets of finger loops 110-140 are formed of an elastic material which stretches to accommodate different sized fingers. In such an embodiment, a single strip of material may be used to form the multiple finger loops 111-114, 121-124, 131-134 and 141-144 or individual pieces of material may be used to form each finger loop 111-114, 121-124, 131-134 and 141-144. Different versions of the case may be made with different sized finger loops to accommodate different sized fingers. The finger loops may also be fabricated of other materials including rigid materials.

Figure 5:
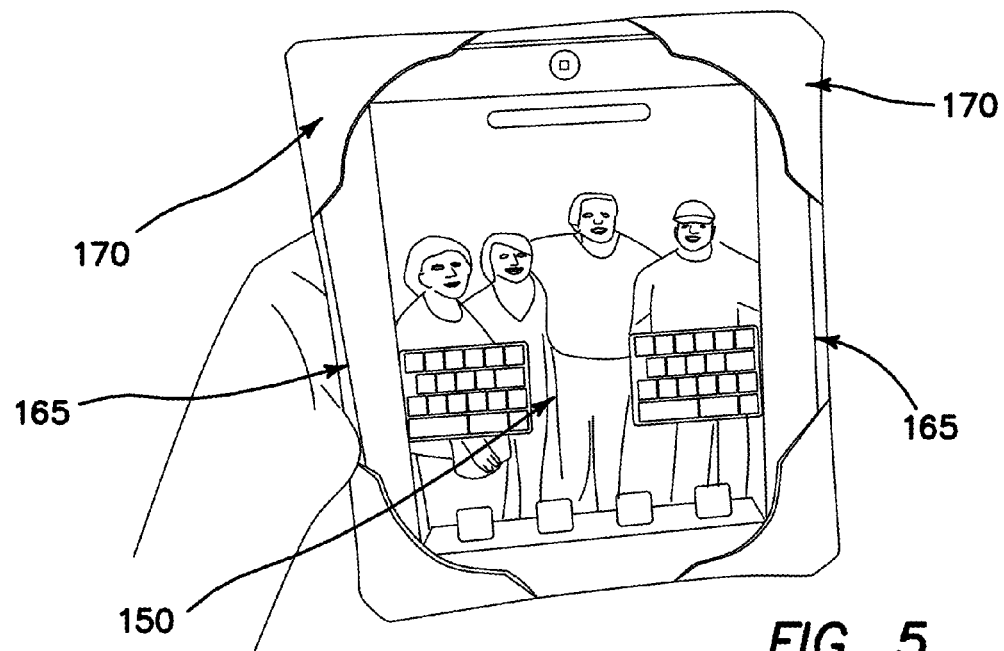
FIG. 5 illustrates a front view of an electronic tablet case being held by a user according to the embodiments of the present invention.
Figure 6:
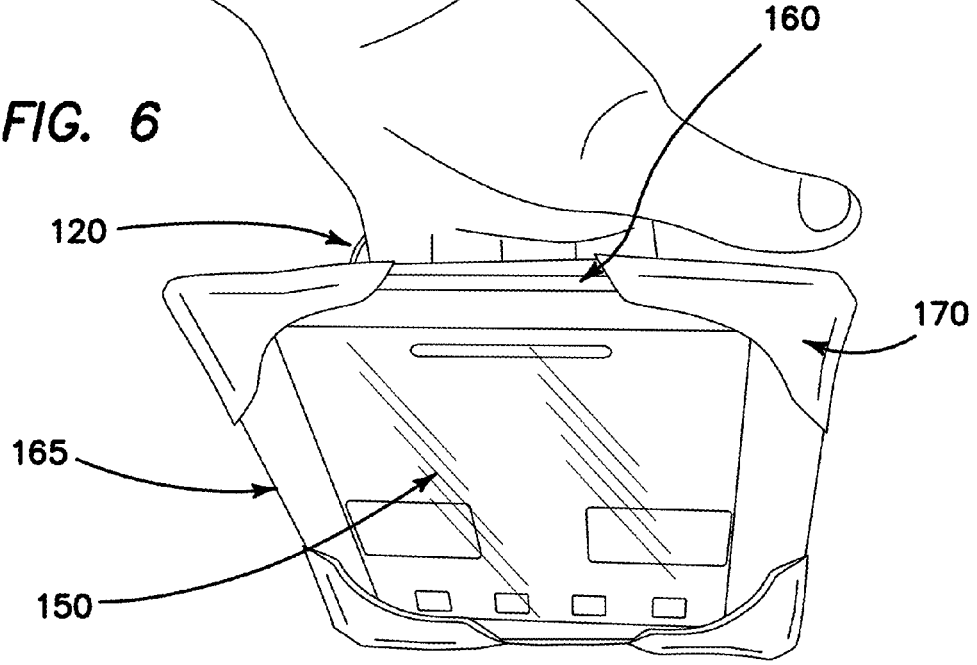
FIG. 6 illustrates a front view of an electronic tablet case supported by fingers of a user according to the embodiments of the present invention.

FIGS. 5 and 6 show front views of the case 100 during use. As shown in FIG. 6, one end of the case 100 includes an opening 160 for receiving the electronic tablet 150. A border 165 forming a front portion of the body 100 includes angled corners 170, which hold the electronic tablet 150 in place, and defines an opening allowing the display of the electronic tablet 150 to be accessed. The border 165 is optional as long as the angled corners 170 are dimensioned to retain the electronic tablet 150 in place. The rear and front portions (border 165 and corners 170 or corners 170) of the body 100 define a sleeve 101 for receipt of the electronic tablet 150. While the rear portion of the body 100 is shown as being solid, it may include one or more openings as well.

Figure 7:
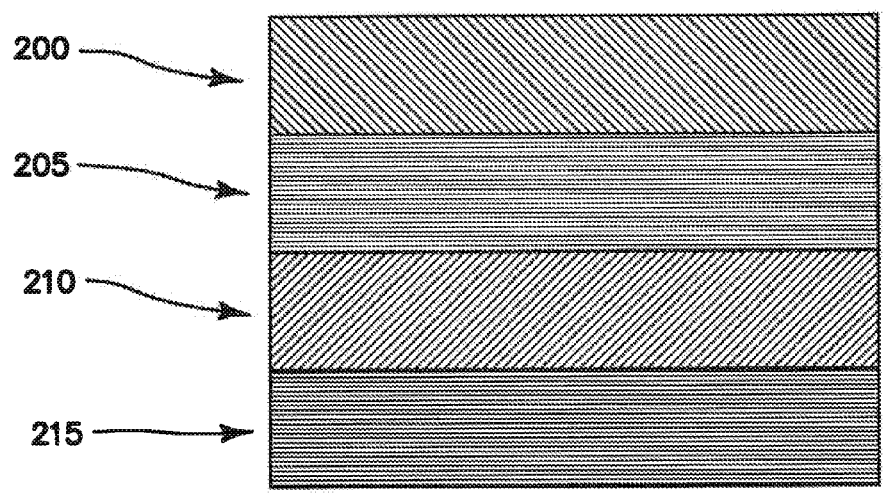
FIG. 7 illustrates a cross-sectional view of an electronic tablet case according to the embodiments of the present invention.
Figure 8:
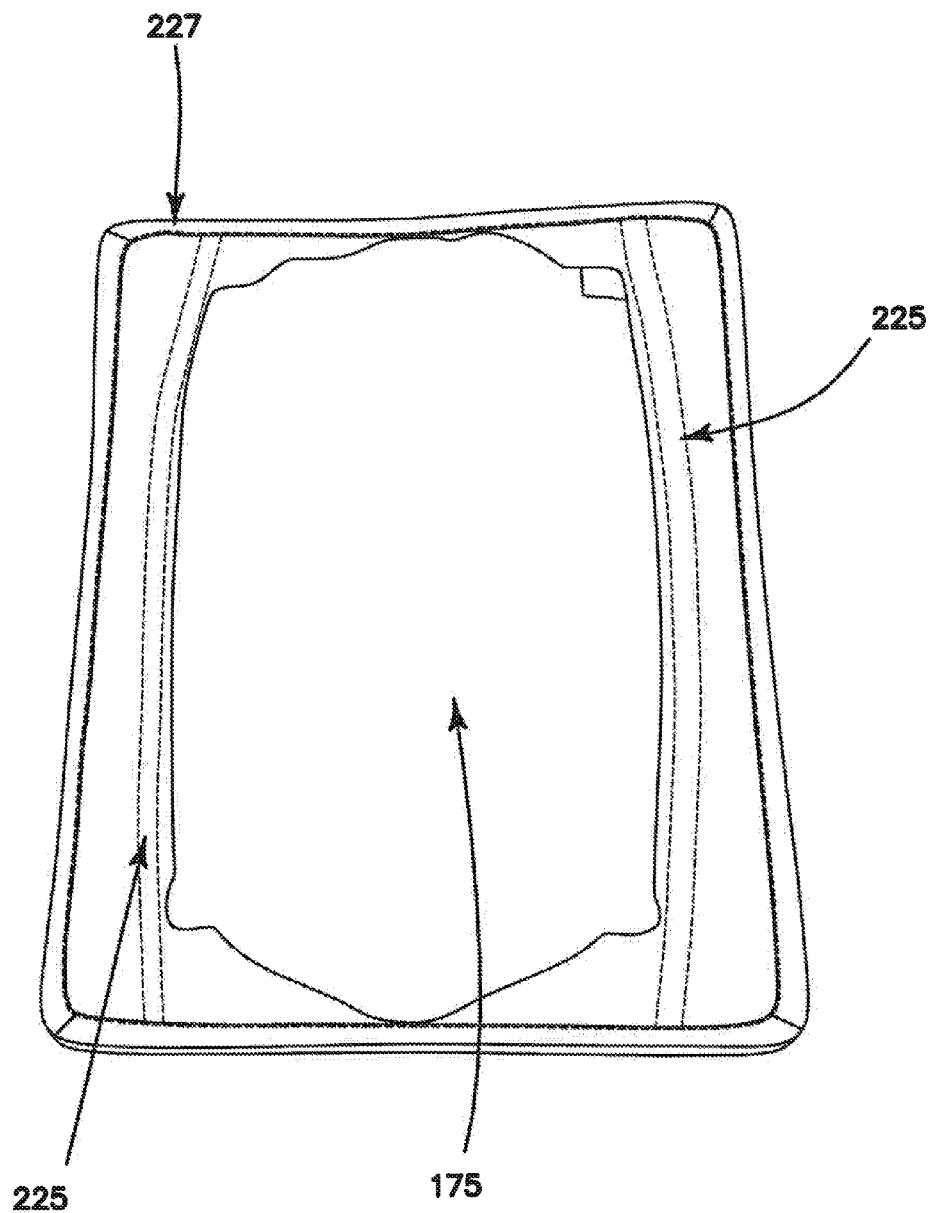
FIG. 8 illustrates a front view of an electronic tablet case according to the embodiments of the present invention.

FIG. 7 illustrates a cross-sectional view of an electronic tablet case 175 according to the embodiments of the present invention. In one embodiment, the case 175 is fabricated of four layers of materials comprising: (1) a waterproof and stain proof outer layer 200; (2) rigid protective layer 205; (3) durable padded layer 210; and (4) non-scratch inner layer 215. In one embodiment, the outer layer 200 is fabricated of a nylon-based material, the rigid protective layer 205 is fabricated of 2 mm thick plastic, the durable padded layer 210 is fabricated of foam and the non-scratch inner layer 215 is fabricated of a soft neoprene. A neoprene face perimeter layer 225, shown in FIG. 8, maintains the tablet in place against the four layers of the body. That is, the neoprene face perimeter layer 225 is connected to a body of said case 175 collectively defining a sleeve 227 for receiving an electronic tablet. Those skilled in the art will recognize that other materials with similar properties may be used for the case 175. For example, the rigid layer 205 may be metal, alloy, composite or the like while the face perimeter layer 225 may be fabricated of other suitable stretchable materials. In one embodiment, the finger loops are sewn into the outer layer 200 which may be fabricated in numerous colors.

The case 175 may include certain cutouts to accommodate certain tablet functions such as camera/flash and adapter ports (e.g., headphone port).

Figure 9:
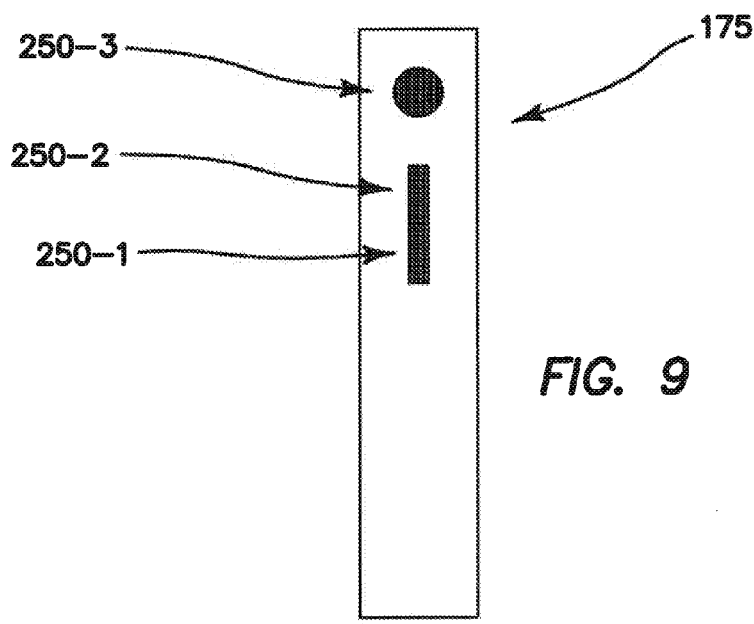
FIG. 9 illustrates a side view of an electronic tablet case according to the embodiments of the present invention.

FIG. 9 illustrates a side view of an electronic tablet case 175 according to the embodiments of the present invention. In one embodiment, the case 175 includes a series of raised portions 250-1 through 250-3 positioned above functional buttons of the tablet. By pressing the raised portions 250-1 through 250-3 on the case 175, the user is able to control certain tablet functionality. As shown, the raised portions 250-1 through 250-3 correspond to volume down, volume up and volume on/off, respectively. In one embodiment, to make the raised portions 250-1 through 250-3 more visible, the raised portions 250-1 through 250-3 are colored distinct from the remaining portions of the case 175. In another embodiment, colored, un-raised portions are utilized to identify the location on the case 175 of certain tablet functional buttons thereunder.

Although the invention has been described in detail with reference to several embodiments, additional variations and modifications exist within the scope and spirit of the invention as described and defined in the following claims.

I claim:

1. An electronic tablet case comprising:
   a body comprising an outer layer, a rigid protective layer beneath said outer layer, a durable padded layer beneath said rigid protective layer and a non-scratch inner layer beneath said durable padded layer;
   a face perimeter layer connected to said body collectively defining a sleeve for receiving an electronic tablet;
   an opening for accessing a display of an electronic tablet; and
   at least one set of finger loops incorporated on said rear portion of the body, said at least one set of finger loops sewn into said outer layer, said at least one set of finger loops comprising two, three or four individual loops, each loop configured to receive a finger, said at least one set of finger loops positioned along, and substantially parallel to, an edge of said rear portion of the body.

2. The electronic tablet case of claim 1 wherein said outer layer is fabricated of nylon.

3. The electronic tablet case claim 1 wherein said rigid protective layer is fabricated of plastic, metal, alloy or composite.

4. The electronic tablet case of claim 1 wherein said durable padded layer is fabricated of foam.

5. The electronic tablet case of claim 1 wherein said non-scratch inner layer is fabricated of neoprene.

6. An electronic tablet case comprising:
   a body comprising an outer layer, a rigid protective layer beneath said outer layer, a durable padded layer beneath said rigid protective layer, a non-scratch inner layer beneath said durable padded layer and a face layer;
   a face perimeter layer connected to said body collectively defining a sleeve for receiving an electronic tablet;
   an opening for accessing a display of an electronic tablet;
   one or more raised portions corresponding to functional tablet buttons thereunder; and
   at least one set of finger loops incorporated on said rear portion of the body, said at least one set of finger loops sewn into said outer layer, said at least one set of finger loops comprising two, three or four individual loops, each loop configured to receive a finger, said at least one set of finger loops positioned along, and substantially parallel to, an edge of said rear portion of the body.

7. The electronic tablet case of claim 6 wherein said outer layer is fabricated of nylon.

8. The electronic tablet case claim 6 wherein said rigid protective layer is fabricated of plastic, metal, alloy or composite.

9. The electronic tablet case of claim 6 wherein said durable padded layer is fabricated of foam.

10. The electronic tablet case of claim 6 wherein said non-scratch inner layer is fabricated of neoprene.

11. The electronic tablet case of claim 6 wherein said raised portions are colored distinct from remaining portions of the case.

12. An electronic tablet case comprising:
   a body comprising an outer layer, a rigid protective layer beneath said outer layer, a durable padded layer beneath said rigid protective layer, a non-scratch inner layer beneath said durable padded layer and a face layer;
   a face perimeter layer connected to said body collectively defining a sleeve for receiving an electronic tablet;
   an opening for accessing a display of an electronic tablet;
   one or more distinguishable portions positioned above functional tablet buttons; and
   at least one set of finger loops incorporated on said rear portion of the body, said at least one set of finger loops sewn into said outer layer, said at least one set of finger loops comprising two, three or four individual loops, each loop configured to receive a finger, said at least one set of finger loops positioned along, and substantially parallel to, an edge of said rear portion of the body.

13. The electronic tablet case of claim 12 wherein said outer layer is fabricated of nylon.

14. The electronic tablet case claim 12 wherein said rigid protective layer is fabricated of plastic, metal, alloy or composite.

15. The electronic tablet case of claim 12 wherein said durable padded layer is fabricated of foam.

16. The electronic tablet case of claim 12 wherein said non-scratch inner layer is fabricated of neoprene.

\* \* \* \* \*